(12) United States Patent
Wu

(10) Patent No.: US 7,561,337 B2
(45) Date of Patent: Jul. 14, 2009

(54) LIGHT COUPLING APPARATUS

(75) Inventor: Yu-Hsi Wu, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 0 days.

(21) Appl. No.: 11/556,555

(22) Filed: Nov. 3, 2006

(65) Prior Publication Data

US 2007/0160340 A1    Jul. 12, 2007

(30) Foreign Application Priority Data

Jan. 11, 2006    (TW) ................................ 95101079 A

(51) Int. Cl.
*G02B 27/14* (2006.01)
(52) U.S. Cl. ...................................... 359/634; 359/638
(58) Field of Classification Search ......... 359/638–640, 359/625–627, 629, 634, 636, 583–584, 589
See application file for complete search history.

(56) References Cited

U.S. PATENT DOCUMENTS

| | | | | |
|---|---|---|---|---|
| 5,042,912 A | * | 8/1991 | Sato et al. | 359/638 |
| 6,097,544 A | * | 8/2000 | Edlinger et al. | 359/634 |
| 6,545,814 B2 | * | 4/2003 | Bartlett et al. | 359/636 |
| 7,210,815 B2 | * | 5/2007 | Imade | 362/234 |
| 7,267,443 B2 | * | 9/2007 | Yamakawa et al. | 353/33 |
| 7,289,264 B2 | * | 10/2007 | Wu et al. | 359/589 |
| 2008/0080167 A1 | * | 4/2008 | Chang | 362/97 |

* cited by examiner

*Primary Examiner*—Alicia M Harrington
(74) *Attorney, Agent, or Firm*—Patterson, Thuente, Skaar & Christensen, P.A.

(57) ABSTRACT

A light coupling apparatus for use in an optical equipment is provided. The light coupling apparatus is used to couple a plurality of different incident lights from different light sources into a light that emits in a substantial single outward direction.

16 Claims, 5 Drawing Sheets

LIGHT COUPLING APPARATUS

This application claims priority based on Taiwan Patent Application No. 095101079 filed on Jan. 11, 2006.

CROSS-REFERENCES TO RELATED APPLICATIONS

Not applicable.

BACKGROUND OF THE INVENTION

1. Field of the Invention

The present invention relates to a light coupling apparatus for use in an optical equipment. In particular, it relates to an apparatus for coupling a plurality of different incident lights from different light sources into lights in a substantial single outward direction or in a plurality of different outward directions.

2. Descriptions of the Related Art

In recent years, the market for optical equipment has developed significantly, improving the quality of related products as well. For example, related optical coupling apparatuses, such as an X-cube, and an X-plate, are widely used and have been dramatically improved. Still, providers are continuing to improve the quality of optical apparatuses to get better light coupling quality.

Taking a Liquid Crystal Display (LCD) as an example, the light projected by a light source must be divided into a red light, a blue light, and a green light by a dichroic mirror. The divided lights then need to be coupled by a light coupling apparatus (usually with an X-cube) to efficiently converge the lights. Finally, the light is incident to an imaging system and is in conjunction with imaging signals to generate an image. FIG. 1_(a) to FIG. 1_(d) includes several kinds of known light coupling apparatuses to schematically show the methods of light coupling.

FIG. 1_(a) shows the way of light coupling of a known X-cube made by four prisms. As shown, an incident light is divided into a red light (R) 101, a green light (G) 102, and a blue light (B) 103. These lights are then coupled by the X-cube 10 into a white light (W) 104. Different kinds of dichroic coatings are applied on a first interface 105 and a second interface 106. The dichroic coating on the first interface 105 allows the red light (R) 101 to reflect and the green light (G) 102 and the blue light (B) 103 to pass through the first interface 105. Likewise, the dichroic coating on the second interface 106 allows the blue light (B) 103 to reflect and the green light (G) 102 and the red light (R) 101 to pass through the second interface 106. After light coupling, a white light (W) 104 is generated. In addition, the light source for use with the X-cube must be divided into R, G, and B primary colors. The incident directions of the lights after division must be fixed as shown in FIG. 1_(a). If the incident directions are at different angles, either light coupling will fail or the white light will be of poor quality.

FIG. 1_(b) shows light coupling of a known X-plate. Comparing with the X-cube 10, the X-plate 20 is configured by two dichroic mirrors. Because the X-plate and X cube 10 share similar features, some reference numerals in FIG. 1_(b) and FIG. 1_(c) (mentioned later) will be the same as FIG. 1_(a). As shown in FIG. 1_(b), the incident light is divided into a red light (R) 101, a green light (G) 102, and a blue light (B) 103. These lights are then coupled by the X-plate 20 into a white light (W) 104. Different kinds of dichroic coatings are applied onto a first plate 105a and a second plate 106a. The dichroic coating on the first plate 105a allows the red light (R) 101 to reflect and the green light (G) 102 and the blue light (B) 103 to pass through the first plate 105a. The dichroic coating on the second plate 106a allows the blue light (B) 103 to reflect and the green light (G) 102 and the red light (R) 101 to pass through the second plate 106a. After light coupling, a white light (W) 104 is generated. The X-plate may be a simpler design in comparison with the X-cube; however, it bears disadvantages that the incident lights must be divided into different single colors beforehand, and the incident angles of light is inflexible. FIG. 1_(c) shows light coupling of known dichroic mirrors. Comparing with the X-cube 10 and the X-plate 20, the dichroic mirror assembly 30 is configured by two diachronic mirrors 107, 108 and a regular mirror 109. As shown in FIG. 1_(c), the incident light is divided into a red light (R) 101, a green light (G) 102, and a blue light (B) 103. The lights are then coupled by the dichroic mirror assembly 30 into a white light (W) 104. The dichroic coating applied on the first dichroic mirror 107 allows the red light (R) 101 to reflect and the green light (G) 102 and the blue light (B) 103 to pass through the first dichroic mirror 107. The other dichroic coating applied on the second dichroic mirror 108 allows the green light (G) 102 to reflect and the blue light (B) 103 to pass through the second dichroic mirror 108. Unfortunately, in this design, the lights must be divided beforehand. In addition, the incident angle can not be adjusted flexibly.

In addition to the aforementioned limits of the three known designs, it is difficult to couple more than three incident lights into a white light. In other words, the prior art is only for the application of coupling three divided lights into a white light.

Another known apparatus combining mirrors 40 is shown in FIG. 1_(d). The ends of the two mirrors 110 form an angle 111, allowing two incident lights 112 to reflect off the mirrors 110, and couple into a white light. Although this apparatus overcomes the need to divide the lights beforehand, it is still not flexible enough to couple more than two incident lights.

Thus, a coupling technique that resolves the previously mentioned limitations is needed in this field.

SUMMARY OF THE INVENTION

The primary object of this invention is to provide a light coupling apparatus for use in an optical equipment, provided for coupling a plurality of different incident lights from different light sources by employing at least two medium with different refractive indexes to totally or partially proceed with total internal reflection, and then, coupling the lights toward a predetermined single direction or directions. The light coupling apparatus is convenient to assemble and configure. It can also fit many different kinds of optical devices. In order to achieve the above-mentioned object, the light coupling apparatus comprises a first medium having a first refractive index (n1) and a second medium, having a second refractive index (n2), wherein n1 is greater than n2, and a 1-2 interface is formed between the second medium and the first medium. A first light source provides a first incident light, totally reflecting onto the 1-2 interface from the first medium and emitting in a coupling direction from the light coupling apparatus. A second light source provides a second incident light, refracting through the 1-2 interface from the second medium into the first medium, and emitting in the coupling direction from the light coupling apparatus.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1_(b) is a schematic view illustrating a known X-plate;

FIG. 1_(c) is a schematic view illustrating a known dichroic mirror assembly;

FIG. 1_(d) is a schematic view illustrating a known combination of mirrors;

DESCRIPTION OF THE PREFERRED EMBODIMENT

The present invention utilizes the total internal reflection theory, according to the Snell's law, in light coupling technology Specifically, according to the Snell's law, when a light is incident into an optically less-dense medium from an optically denser medium, the incident light will totally reflect from the interface back to the denser medium without being refracted to the less-dense medium because the index of refraction of the optically denser medium is greater than that of the less-dense medium. This is true if the incident angle (that is, the angle between the incident light and the line normal to the interface of the two media) is greater than the critical angle. People skilled in this field can easily understand that the angle between the incident and reflecting lights is not necessarily 90 degrees as shown in the figures of the application. Any other angles applicable to the total internal reflection property are feasible for this invention.

Figure 1:
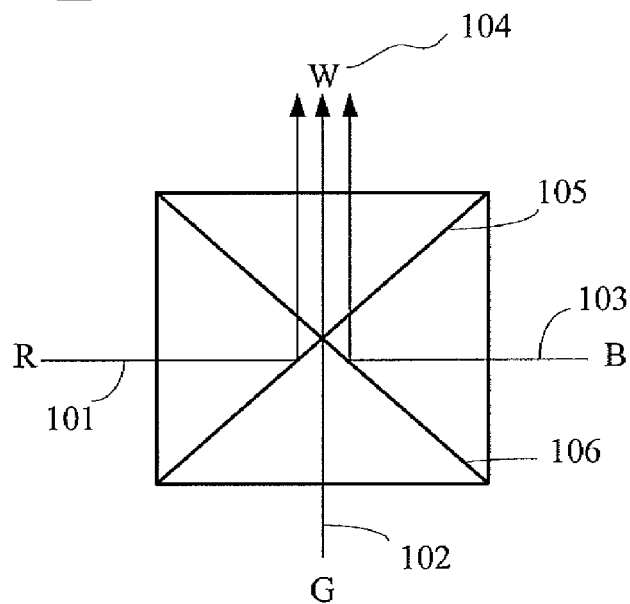
FIG. 1_(a) is a schematic view illustrating a known X-cube.
Figure 1:
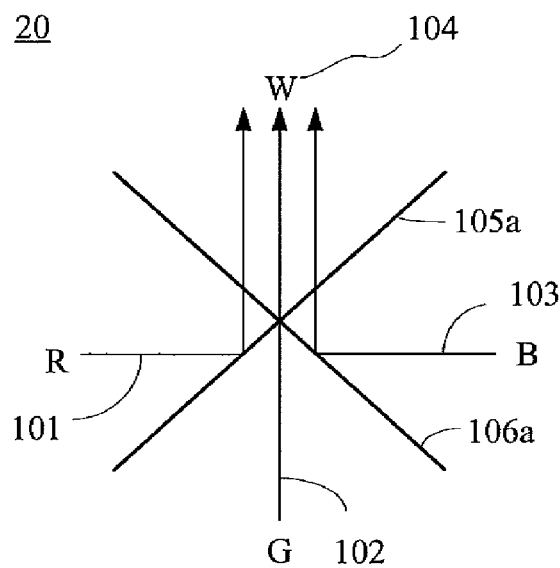
Figure 1:
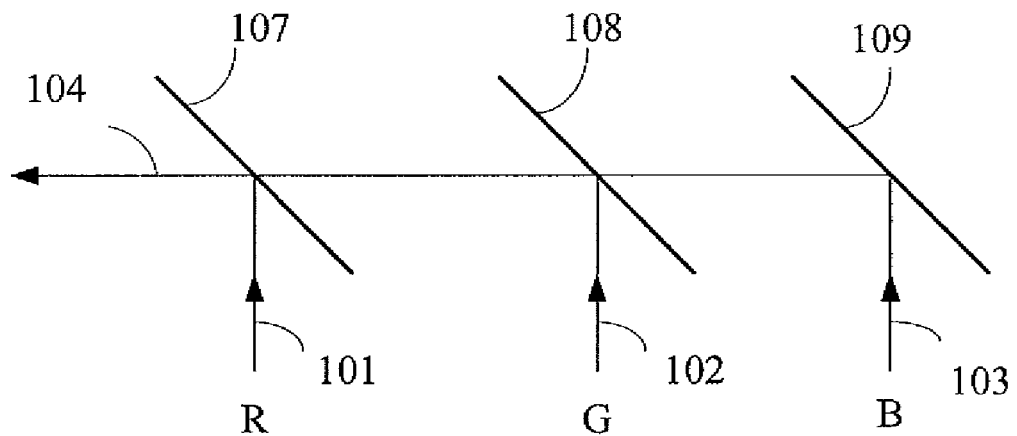
Figure 1:
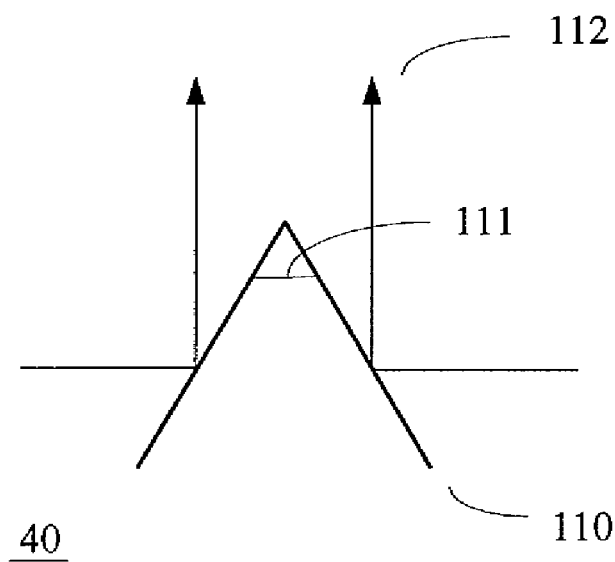
Figure 2:
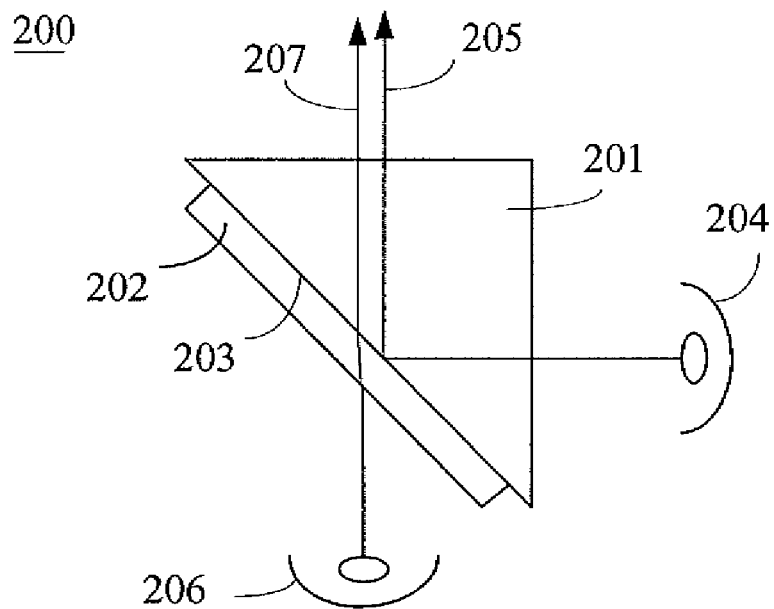
FIG. 2 illustrates a first embodiment of the present invention.

The first embodiment of the present invention, as shown in FIG. 2, is a light coupling apparatus 200 for use in optical equipment. The apparatus is provided for coupling two different incident lights from two different light sources. The light coupling apparatus 200 comprises: a first medium 201 which has a first refractive index n1 and a second medium 202 which has a second refractive index n2. The index n1 is greater than n2, and a 1-2 interface 203 is formed between the second medium 202 and the first medium 201. This would be the condition that the so-defined total internal reflection applies. A first light source 204 provides a first incident light 205. The first incident light 205 totally reflects onto the 1-2 interface 203 from the first medium 201, and emits in a coupling direction from the light coupling apparatus 200. A second light source 206 provides a second incident light 207. The second incident light 207 refracts through the 1-2 interface 203 into the first medium 201 from the second medium 202, and emits in the coupling direction from the light coupling apparatus 200.

If the above-mentioned second medium 202 is air, then n2=1. The second medium 202 can be a surface coating applied into the 1-2 interface 203. They are different examples of the first embodiment, saying the first example and second example. In the first example, of which n2 is equal to 1, the light source 206 is placed in an air medium so that the incident light will directly refract into the first medium 201 and travel outward in the predetermined coupling direction.

In the second example, if the light source 206 is placed in an air medium as well, the incident light will refract into the second medium 202 first, then refract into the first medium 201 and travel outward in the predetermined coupling direction. Placements and orientations of the first light source 204 and the second light source 206 in the above-mentioned two examples are adjustable under the actual desired situation.

Figure 3:
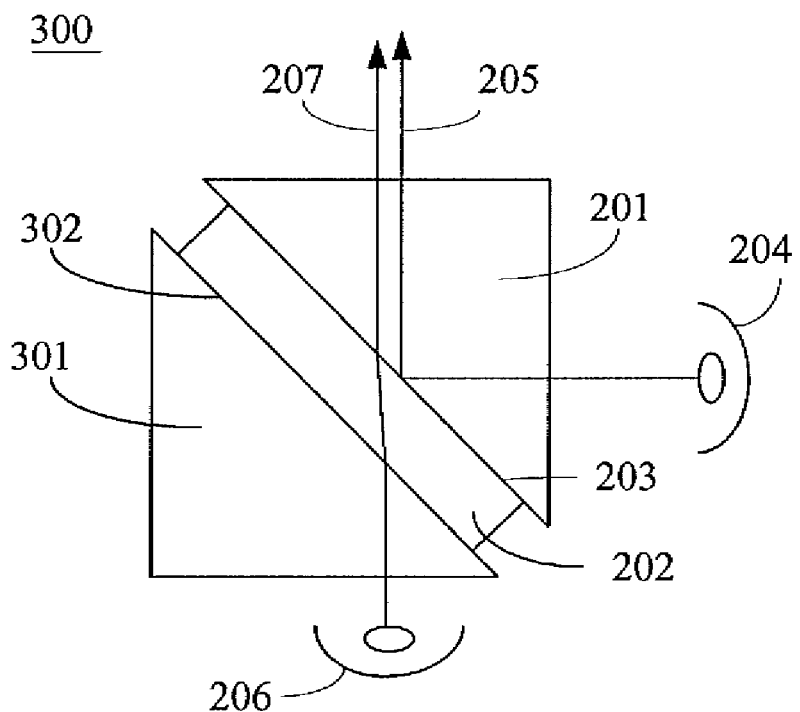
FIG. 3 illustrates an alternative of the first embodiment of the present invention.

Furthermore, an alternative to the previous method is to add medium to the first embodiment. This alternative is illustrated in FIG. 3, in which some of the reference numerals overlap with those in FIG. 2 for convenience. The light coupling apparatus 200 further comprises a third medium 301, which has a third refractive index n3. In this case, a 2-3 interface 302 is formed between the second medium 202 and the third medium 301. The second incident light 207 refracts through the 2-3 interface 302 from the third medium 301 into the second medium 202. The light then refracts through the 1-2 interface 203 and into the first medium 201, finally emitting together with the first incident light 205 in the coupling direction from the light coupling apparatus 300.

In the alternative embodiment, the second medium 202 can also be air with an index of n2=1 as well. The medium can be a surface coating which has a refractive index less than n1, and can be applied onto the 1-2 interface 203 or 2-3 interface 302. In addition, the coating is adapted to be sandwiched between the first medium and the third medium, or any other analogous arrangement. Setting the third refractive index and the first refractive index equal to each other (n3=n1) is feasible as well.

The traveling path of the first incident light 205 of the first light source 204, along with its total internal reflection onto the 1-2 interface, is the same as shown in FIG. 2. For this reason, repetitive descriptions are omitted. After the second incident light 207, which is provided by the second light source 206, is incident into the third medium 301, the second incident light 207 refracts into the second medium 202, and then refracts into the first medium 201 through the 1-2 interface 203. Finally, the second incident light 207 and the first incident light 205 emit outward in the desired coupling direction from the light coupling apparatus 300.

Figure 4:
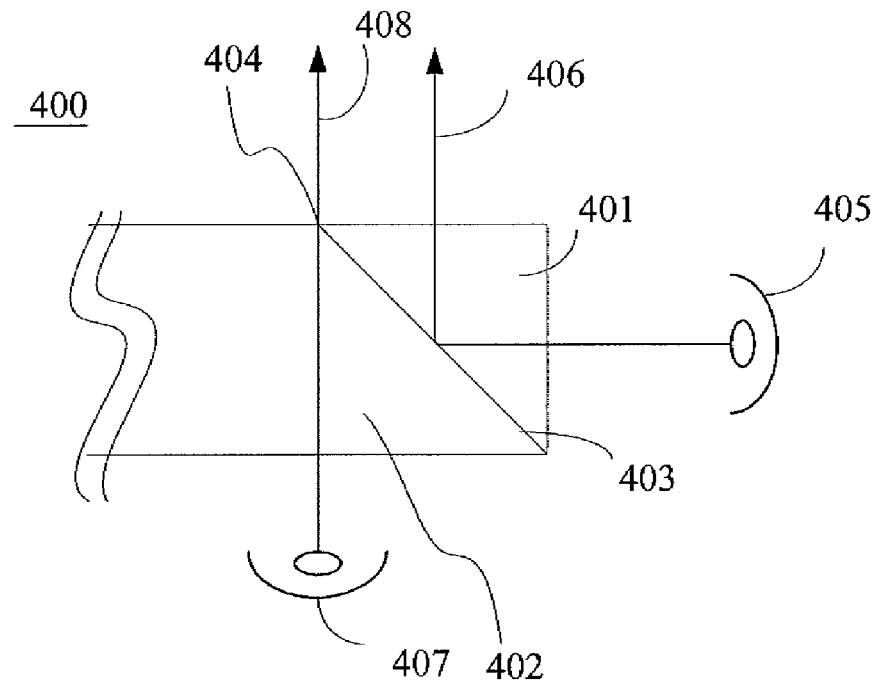
FIG. 4 illustrates a second embodiment of the present invention.

The second embodiment of the present invention, as shown in FIG. 4, is a light coupling apparatus 400 for use in optical equipment. This apparatus is provided for coupling a plurality of different incident lights from different light sources into lights that emit outward in a substantially single direction from the apparatus 400. The second embodiment also utilizes the above total reflection principle. The light coupling apparatus 400 comprises: a first medium 401, which has a first refractive index n1; and a second medium 402, which has a second refractive index n2. The index n1 is greater than n2, while the 1-2 interface 403 is formed between the second medium 402 and the first medium 401. The 1-2 interface 403 comprises a 1-2 boundary 404. A first light source 405 provides a first incident light 406. The first incident light 406 totally reflects onto the 1-2 interface 403 from the first medium 401, and emits in the coupling direction from the first medium 401. A second light source 407 provides a second incident light 408, refracting through the 1-2 boundary 404 of the 1-2 interface 403 from the second medium 402, and emitting together with the first incident light 406 in the coupling direction from the light coupling apparatus 400. In fact, because the light travels regionally, it will not perfectly travel through the 1-2 boundary 404 and go outwards. Part of the second incident light 408 also travels through the 1-2 interface 403 and refracts, traveling outward for light coupling.

Similar to the first embodiment, the second medium 402 of the second embodiment can be air with n2=1.

Figure 5:
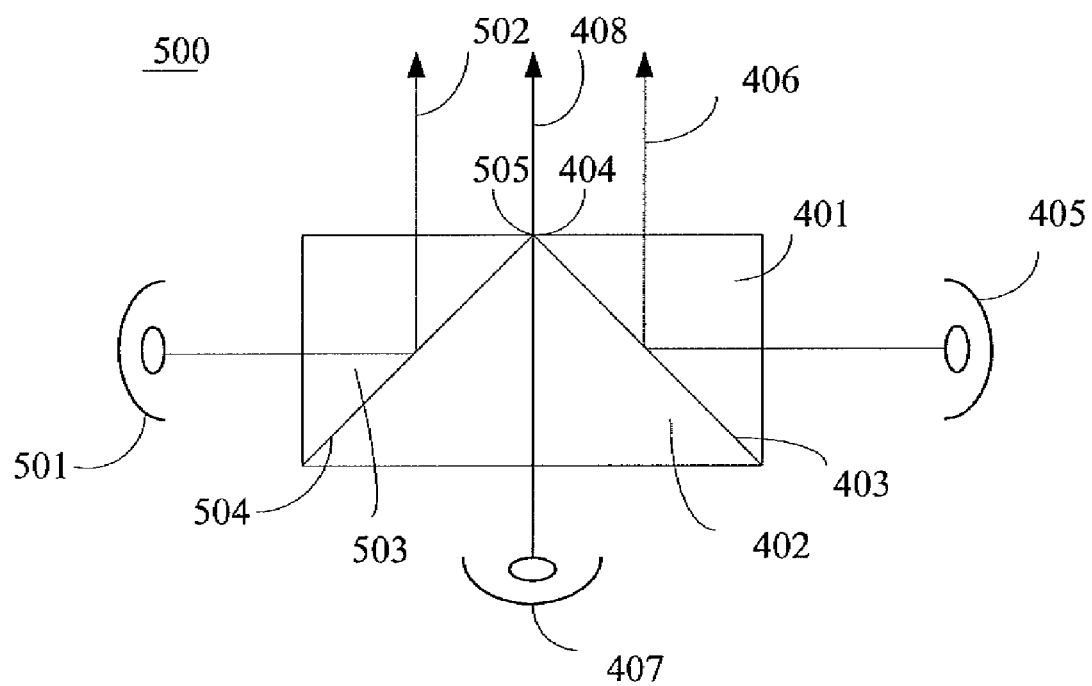
FIG. 5 illustrates an alternative of the second embodiment of the present invention.

Furthermore, an alternative of the second embodiment is to add some other media (e.g., a third medium 503) to the aforementioned apparatus, which is shown in FIG. 5. Some of the reference numerals in FIG. 4 are adopted in FIG. 5 for convenience. In particular, the similarities, as shown in FIG. 4, include the light path of the first incident light 406 of the first light source 405 and its total internal reflection occurring on the 1-2 interface 403, as well as the light path of the second incident light 408 of the second light source 407 through the boundary 404 and onto the 1-2 interface 403. Therefore, the repetitive descriptions are omitted. The light coupling apparatus 500 further comprises: a third light source 501 that provides a third incident light 502; and a third medium 503, which has a third refractive index n3, wherein n3>n2. A 2-3 interface 504 is formed between the second medium 402 and the third medium 503. The 2-3 interface 504 comprises a 2-3 boundary 505. The third incident light 502 travels from the third medium 503 onto the 2-3 interface 504 with an incident angle that is greater than the critical angle, then totally reflecting from the 2-3 interface 504. The third incident light 502 finally couples with the first incident light 406 and the second incident light 408 to emit outwards from the light coupling apparatus 500. It is understandable that the above-mentioned n3=n1 is also applicable here.

The above-mentioned second medium 402 can be replaced by at least two surface coatings. In other words, the two surface coatings are applied to the 1-2 interface 403 and the 2-3 interface 504, respectively. The 1-2 boundary 404 and the 2-3 boundary 505 essentially coincide with each other. This means the two boundaries are essentially the same and can share common borders with the first medium 401 and the third medium 503. Alternatively, instead of replacing the second medium 402, the light coupling apparatus 500 may further comprise two additional media (for example, the two surface coatings) applied between the first medium 401 and the second medium 402, and between the second medium 402 and the third medium 503, respectively. This is the analogous coupling effect performed under a refraction model similar to that shown in FIG. 3.

Figure 6:
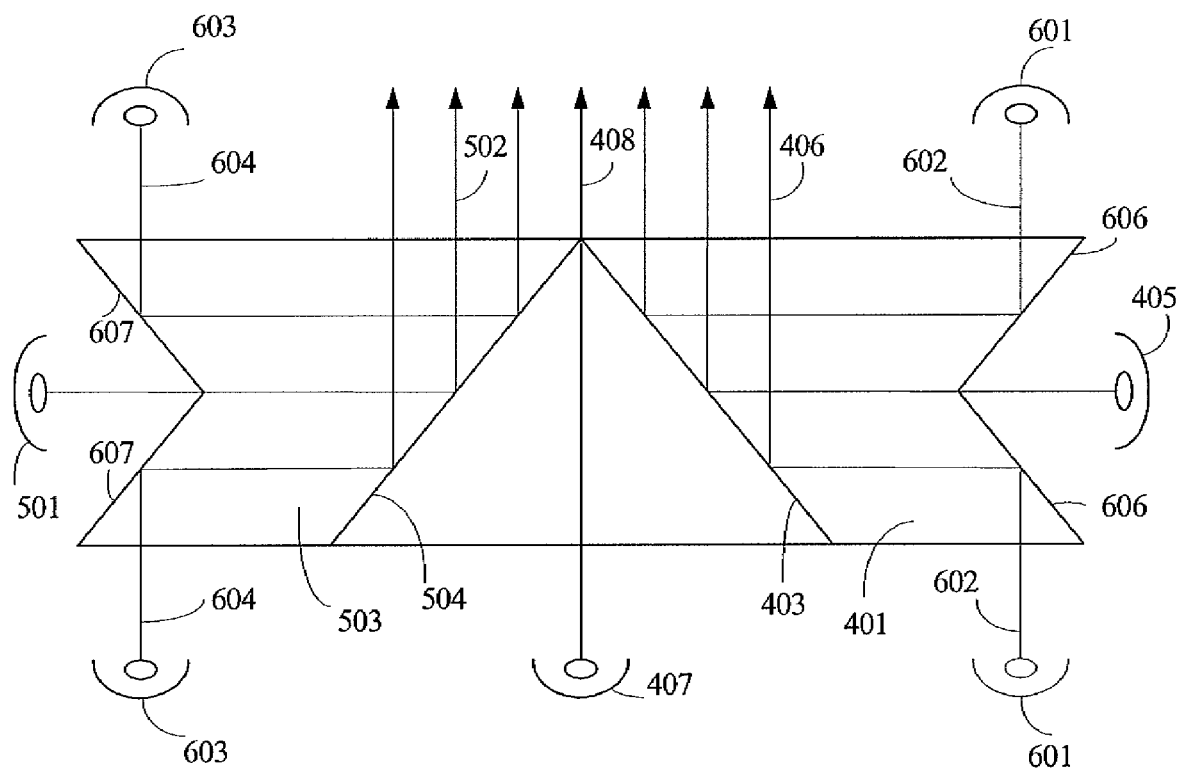
FIG. 6 illustrates a third embodiment of the present invention.

The third embodiment of the present invention, as shown in FIG. 6, is a combination of the first and the second embodiments. Some repeating reference numerals in FIG. 4 and FIG. 5 are adopted in FIG. 6 for convenience. The repeat descriptions for the light sources 405, 407, and 501 of FIG. 5 are omitted for this embodiment. The light coupling apparatus 600 further comprises at least a fourth light source 601 which provides a fourth incident light 602. The fourth incident light 602 totally reflects onto an interface (i.e. a 0-1 interface 606) formed by air and the first medium. This light then reflects onto the 1-2 interface 403, and emits in the predetermined coupling direction from the light coupling apparatus 401. There are two other occasions of the fourth light source 601 shown in FIG. 6 for reference.

As mentioned above, an alternative of the third embodiment is applicable. The light coupling apparatus 600 further comprises, at the least, a fourth light source 603, which provides, at the least, an incident light 604. The incident light 604 totally reflects onto an interface (i.e. a 0-3 interface 607) formed by air and the third medium 503. This light then totally reflects onto the 2-3 interface 504 from the third medium 503, and then emits in the coupling direction from the third medium 503. There are two other similar occasions of the fourth light source 603 shown in FIG. 6 as well for reference.

It can be further derived from FIG. 6 that the third embodiment further comprises a plurality of fourth light sources (not shown) to provide a plurality of fourth incident lights (not shown). Each of the fourth incident lights totally reflects onto the 1-2 interface 403 and the 2-3 interface 504 from the first medium 401 and the third medium 503, respectively, emitting in a coupling direction from the light coupling apparatus 600. The light coupling apparatus 600 can analogously comprise two surface coatings which are applied in the same way as the light coupling apparatus 500 to proceed with a similar refraction model as shown in FIG. 3, thereby performing the same effect.

In reality, the light sources, light projections, and complicated way of the optical paths are very difficult to verbally describe or illustrate. To make the descriptions for the present invention clearer, the above descriptions and illustrative drawings shown below only present "principle representation light" as the whole light path. People skilled in this field should sophisticatedly understand the complexity of real light. For example, due to the inherent property of diffusion and convergence, light usually travels in a sweeping area of positive-to-negative angle of 30 degrees. Thus, the descriptions for light emission may be referred to by the travel of light along a single desired direction, or alternatively, along distinctive directions, followed by a focus-in adjustment to form a single directional path. Either way, the basic goal of the light coupling may be achieved.

After the knowledge of the total internal reflection as disclosed herein, it is understandable That people skilled in this field may implement the light coupling process according to the Present invention without dividing lights into different colors as exercised in prior art. The Present invention does not limit the types of light sources used, including high intensity discharge (HID) lamps, laser lighting, light emitting diode (LED), and other types or the combination thereof. The geometric configurations of the first, the second, and the third mediums shall not be limited. The above disclosure is related to the detailed technical contents and inventive features thereof People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light coupling apparatus for use in optical equipment, provided for coupling different incident lights of a plurality of different light sources toward a predetermined direction(s), the light coupling apparatus comprising:

a first medium having a first refractive index (n1);

a second medium, having a second refractive index (n2), wherein the first refractive index is greater than the second refractive index, and a first to second medium interface is formed between the second medium and the first medium;

a first light source, providing a first incident light directly emitting into the first medium, totally internally reflecting on the first to second medium interface from the first medium, and emitting in a coupling direction from the light coupling apparatus;

a second light source, providing a second incident light, refracted through the first to second medium interface into the first medium from the second medium, and emitting in the coupling direction from the light coupling apparatus; and a third medium, having a third refractive index (n3) greater than the second refractive index, and wherein a second to third medium interface is formed between the second medium and the third medium; the second incident light refracting through the second to third medium interface into the second medium from the third medium, then refracting through the first to second medium interface into the first medium, and then emitting in the coupling direction from the light coupling apparatus.

2. The light coupling apparatus as claimed in claim 1, wherein the second medium is air with the second refractive index substantially equal to 1.

3. The light coupling apparatus as claimed in claim 1, wherein the second medium is a surface coating, applied onto the first to second medium interface.

4. The light coupling apparatus as claimed in claim 1, wherein the second medium is air with the second refractive index substantially equal to 1.

5. The light coupling apparatus as claimed in claim 1, wherein the second medium is a surface coating, applied between the first medium and the third medium.

6. The light coupling apparatus as claimed in claim 1, wherein the first refractive index is equal to the third refractive index.

7. The light coupling apparatus as claimed in claim 1, wherein the plurality of the different light sources comprise high intensity discharge (HID) lights.

8. The light coupling apparatus as claimed in claim 1, wherein the plurality of the different light sources comprise laser light sources.

9. The light coupling apparatus as claimed in claim 1, wherein the plurality of the different light sources comprise light emitting diode (LED) sources.

10. A light coupling apparatus for use in optical equipment, provided for coupling different incident lights of a plurality of different light sources toward a predetermined direction(s), the light coupling apparatus comprising:
a first medium having a first refractive index (n1);
a second medium, having a second refractive index (n2), wherein the first refractive index is greater than the second refractive index, and a first to second medium interface is formed between the second medium and the first medium;
a first light source, providing a first incident light directly emitting into the first medium, totally internally reflecting on the first to second medium interface from the first medium, and emitting in a coupling direction from the light coupling apparatus;
a second light source, providing a second incident light, refracted through the first to second medium interface into the first medium from the second medium, and emitting in the coupling direction from the light coupling apparatus; and
a third medium, having a third refractive index (n3) equal to the second refractive index, and wherein a second to third medium interface is formed between the second medium and the third medium; the second incident light refracting through the second to third medium interface into the second medium from the third medium, then refracting through the first to second medium interface into the first medium, and then emitting in the coupling direction from the light coupling apparatus.

11. A light coupling apparatus for use in optical equipment, provided for coupling different incident lights of a plurality of different light sources toward a predetermined direction(s), the light coupling apparatus comprising:
a first medium having a first refractive index (n1);
a second medium, having a second refractive index (n2), wherein the first refractive index is greater than the second refractive index, and a first to second medium interface is formed between the second medium and the first medium;
a first light source, providing a first incident light directly emitting into the first medium, totally internally reflecting on the first to second medium interface from the first medium, and emitting in a coupling direction from the light coupling apparatus:
a second light source, providing a second incident light, refracted through the first to second medium interface into the first medium from the second medium, and emitting in the coupling direction from the light coupling apparatus;
a third light source, providing a third incident light; and
a third medium, having a third refractive index (n3), wherein the third refractive index is greater than the second refractive index, and a second to third medium interface is formed between the second medium and the third medium; the third incident light totally internally reflecting on the second to third medium interface from the third medium, emitting in the coupling direction from the third medium; the first to second medium interface comprising a first to second medium boundary, and the second to third medium interface comprising a second to third medium boundary, the first to second medium boundary and the second to third medium boundary being essentially coincident with each other.

12. The light coupling apparatus as claimed in claim 11, further comprising:
a first surface coating, applied between the first medium and the second medium, and a second surface coating applied between the second medium and the third medium.

13. The light coupling apparatus as claimed in claim 11, further comprising:
at least a fourth light source, providing at least a fourth incident light, totally internally reflecting on the first to second medium interface from the first medium, and emitting in the coupling direction from the first medium.

14. The light coupling apparatus as claimed in claim 11, further comprising:
at least a fourth light source providing at least a fourth incident light, totally internally reflecting on the second to third medium interface from the third medium, and emitting in the coupling direction from the third medium.

15. The light coupling apparatus as claimed in claim 11, further comprising:
a plurality of fourth light sources providing a plurality of fourth incident lights, totally internally reflecting on the first to second medium interface and the second to third medium interface from each of the first medium and the third medium, respectively, and emitting together in the coupling direction from the light coupling apparatus.

16. The light coupling apparatus as claimed in claim 15, further comprising:
a first surface coating applied between the first medium and the second medium, and a second surface coating applied between the second medium and the third medium.

* * * * *